(12) United States Patent
Basilico

(10) Patent No.: US 7,333,394 B2
(45) Date of Patent: Feb. 19, 2008

(54) NAVIGATIONAL AID FOR DIVER

(76) Inventor: Albert R. Basilico, 14025 Bingham Dr., Raleigh, NC (US) 27614

( * ) Notice: Subject to any disclaimer, the term of this patent is extended or adjusted under 35 U.S.C. 154(b) by 293 days.

(21) Appl. No.: 11/158,678

(22) Filed: Jun. 22, 2005

(65) Prior Publication Data

US 2006/0293806 A1    Dec. 28, 2006

(51) Int. Cl.
*G01S 3/80* (2006.01)
(52) U.S. Cl. .......................... 367/124; 367/131; 701/21
(58) Field of Classification Search ................ 367/124, 367/131; 701/21, 200
See application file for complete search history.

(56) References Cited

U.S. PATENT DOCUMENTS

| | | |
|---|---|---|
| 3,944,967 A | 3/1976 | Acks et al. |
| 3,986,161 A | 10/1976 | MacKellar |
| 4,103,279 A * | 7/1978 | Dildy et al. ................... 367/87 |
| 4,128,839 A * | 12/1978 | McComas ..................... 342/32 |
| 4,315,263 A | 2/1982 | Neidell |
| 4,558,439 A | 12/1985 | Güdesen |
| 4,604,733 A | 8/1986 | Brown et al. |
| 4,622,557 A | 11/1986 | Westerfield |
| 5,038,406 A | 8/1991 | Titterton et al. |
| 5,077,703 A | 12/1991 | Strauss |
| 5,079,753 A | 1/1992 | Suggs |
| 5,119,341 A | 6/1992 | Youngberg |
| 5,148,412 A | 9/1992 | Suggs |
| 5,185,725 A | 2/1993 | Kent et al. |
| 5,187,871 A | 2/1993 | McDermott |
| 5,303,206 A | 4/1994 | Bemb et al. |
| 5,331,602 A | 7/1994 | McLaren |
| 5,369,623 A | 11/1994 | Zerangue |
| 5,570,323 A | 10/1996 | Prichard et al. |
| 5,579,285 A | 11/1996 | Hubert |
| 5,659,520 A | 8/1997 | Watson et al. |
| 5,668,775 A | 9/1997 | Hatteland |
| 5,708,626 A | 1/1998 | Hrubes |
| 5,761,153 A | 6/1998 | Gikas et al. |
| 5,784,339 A | 7/1998 | Woodsum et al. |
| 5,899,204 A | 5/1999 | Cochran |
| 5,956,291 A | 9/1999 | Nehemiah et al. |
| 6,016,119 A | 1/2000 | Krasner |
| 6,163,503 A | 12/2000 | Gudbjornsson |
| 6,327,220 B1 | 12/2001 | Miller, Jr. et al. |
| 6,377,515 B1 | 4/2002 | Healey |
| 6,396,432 B1 | 5/2002 | Riemschneider et al. |
| 6,625,083 B2 | 9/2003 | Vandenbroucke |
| 6,665,631 B2 | 12/2003 | Steinbrecher |
| 6,690,618 B2 | 2/2004 | Tomasi et al. |
| 6,750,845 B2 | 6/2004 | Hopper |
| 6,791,490 B2 | 9/2004 | King |
| 6,807,127 B2 | 10/2004 | McGeever, Jr. |
| 6,816,437 B1 | 11/2004 | Teller et al. |
| 2002/0140599 A1 | 10/2002 | King |
| 2003/0117893 A1 | 6/2003 | Bary |

(Continued)

FOREIGN PATENT DOCUMENTS

JP          6206589         7/1994

*Primary Examiner*—Ian J. Lobo
(74) *Attorney, Agent, or Firm*—Coats & Bennett, P.L.L.C.

(57) ABSTRACT

A diver unit computes the direction and distance to a specified target. When the target is obstructed, the diver unit receives navigation assistance data from another diver unit. The navigation assistance data includes direction information that is referenced to a common reference line extending between the two diver units.

20 Claims, 8 Drawing Sheets

U.S. PATENT DOCUMENTS

| | | |
|---|---|---|
| 2003/0135326 A1 | 7/2003 | Brown |
| 2004/0068371 A1 | 4/2004 | Estep |
| 2004/0155815 A1 | 8/2004 | Muncaster et al. |
| 2004/0196180 A1 | 10/2004 | Hollis et al. |
| 2004/0233784 A1 | 11/2004 | Bernard |
| 2006/0196499 A1* | 9/2006 | Cannizzaro ............ 128/200.14 |
| 2007/0006472 A1* | 1/2007 | Bauch ...................... 33/355 R |

* cited by examiner

NAVIGATIONAL AID FOR DIVER

BACKGROUND OF THE INVENTION

The present invention relates generally to underwater navigational aids and, more particularly, to a method and apparatus for computing direction and distance to an obstructed target.

Recreational diving is a popular sport and is growing rapidly. A problem often encountered by recreational divers is navigating underwater. Divers often need to find their way to a particular location, such as an anchored dive boat or an underwater attraction, e.g., coral reef or sunken vessel. Additionally, it is sometimes necessary for an underwater diver to locate a dive companion. Visual navigation may not always be practical. For example, the diver may be located in an area with poor underwater visibility, or may be at too great a distance from the person or object of interest. Further, there may be an obstruction between the diver and the desired target. In these situations, the diver may be required to surface in order to obtain a bearing. Surfacing may be inconvenient due to the need to decompress.

SUMMARY OF THE INVENTION

The present invention provides a navigation aid for divers to facilitate underwater navigation without surfacing. The navigation aid, also referred to herein as a diver unit, may be worn on the diver's wrist. The diver unit may communicate over sonar frequencies with a boat unit, a beacon unit, or other diver units. The boat unit, beacon units, and diver units communicate using the same frequency and a time division multiple access scheme. Various techniques can be used to obtain distance and direction to a target. The target may be the dive boat, a beacon located at an underwater attraction, or a companion diver.

In one aspect of the invention, a protocol is established for communicating direction information between two diver units. The ability to communicate direction information between two diver units allows a first diver unit to provide navigational assistance to a second diver unit. Currently, there is no convenient way to convey direction information from one diver unit to another due to the lack of a common reference for angular measurements. According to the present invention, a first diver unit with an unobstructed line of sight to a target can compute the distance and direction of a second diver unit to the target and transmit the distance and direction information to the second diver unit. The direction information transmitted from the first diver unit to the second diver unit is related to a common reference line that is known or can be determined by both the first and second diver units. In one embodiment, the direction information transmitted from one diver unit to another is referenced to a line extending through the current locations of the first and second diver units. Because both diver units are able to determine the orientation of the common reference line to their own internal angular references, the receiving diver unit can translate the received direction information to its own internal reference.

DETAILED DESCRIPTION OF THE INVENTION

Figure 1:
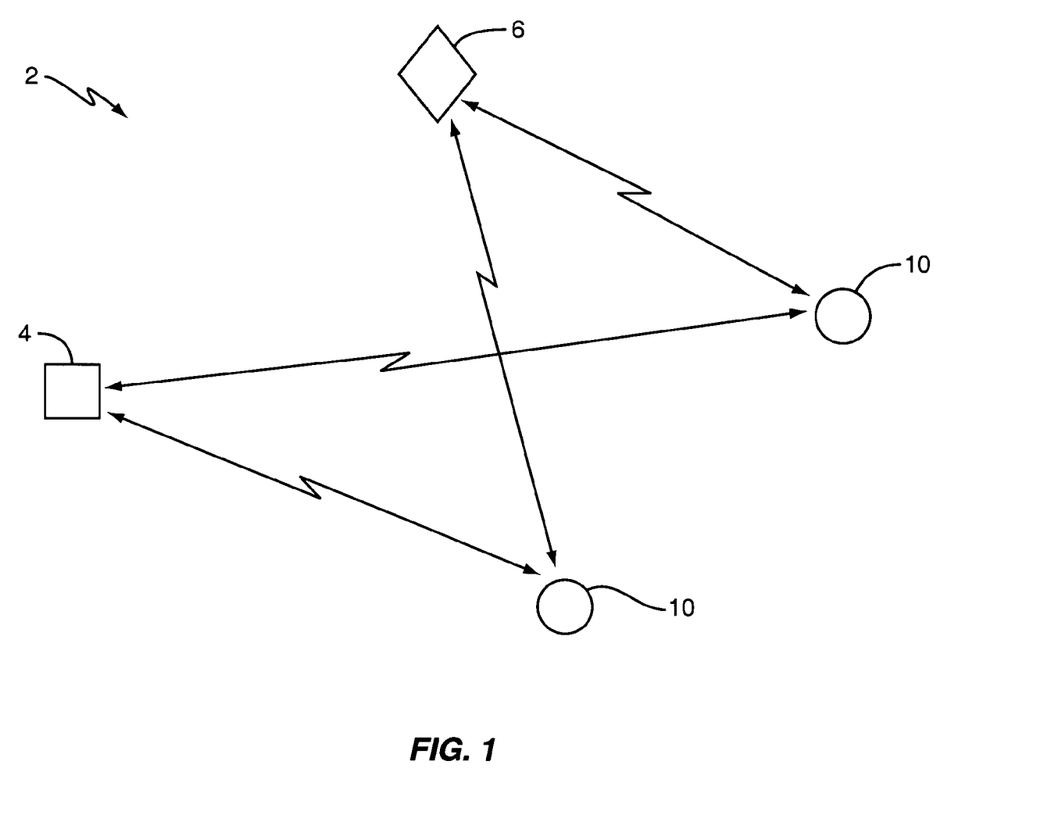
FIG. 1 illustrates a communication system according to the present invention.

Referring now to the drawings, FIG. 1 illustrates a communication system 2 comprising a boat unit 4, one or more beacon units 6, and a plurality of diver units 10. The boat unit 4 normally functions as a "master unit" and controls communications between the various entities in the communication system 2. Beacon units 6 are used primarily as markers and can provide navigation assistance to the diver units 10 as hereinafter described. Beacon units 6 may be located on the surface, or may be underwater. Beacon units 6 can function as master units if no boat unit 4 is present. If there is more than one beacon unit 6, the beacon unit 6 with the highest (or lowest address) address may be selected to serve as the master unit. Diver units 10 are worn or carried by divers and are used for underwater communication and navigation. Diver units 10 can function as master units if no boat unit 4 or beacon unit 6 is present. If there is more than one diver unit 10, the diver unit 10 with the highest (or lowest address) address may be selected to serve as the master unit.

Figure 2:
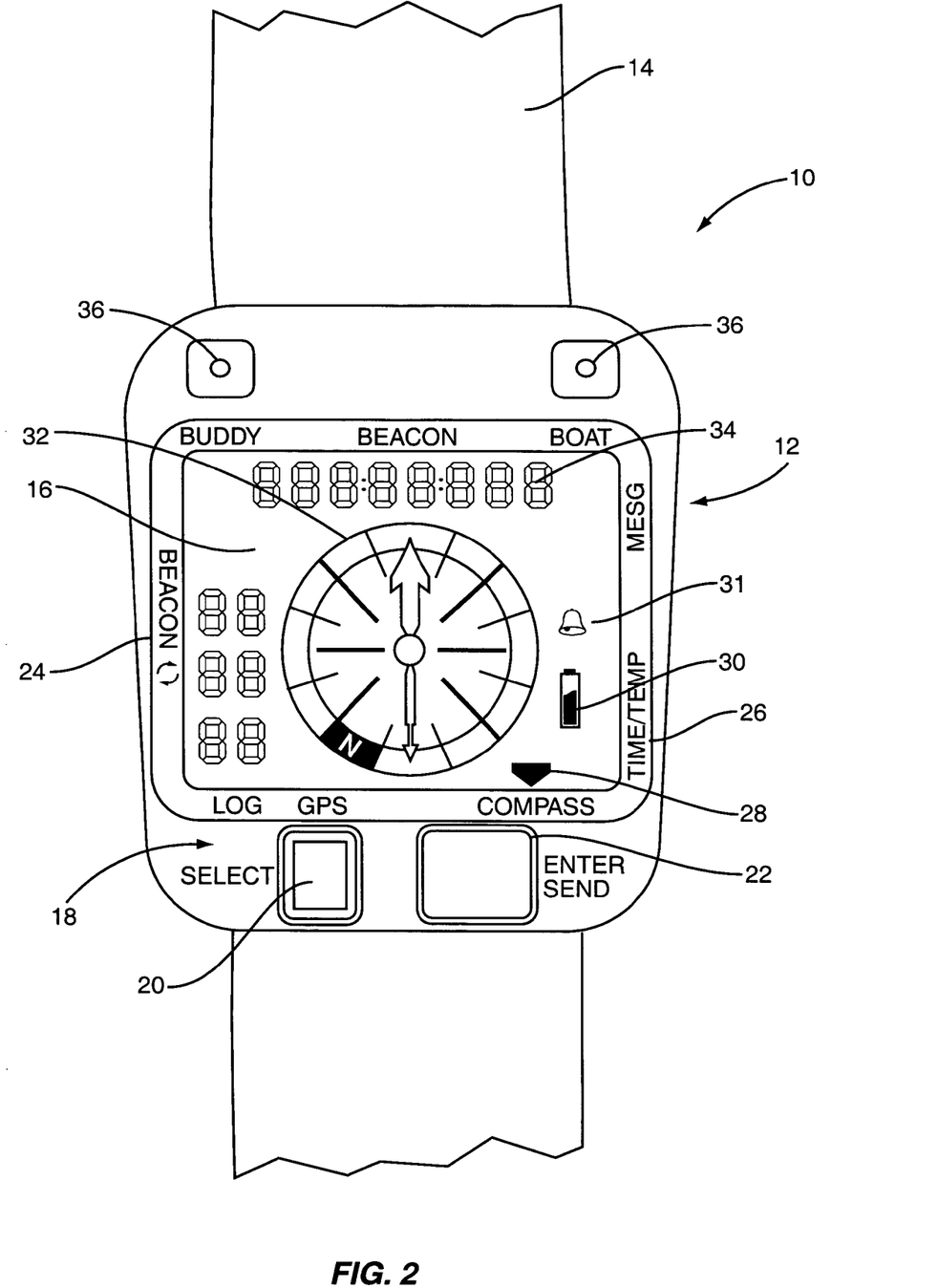
FIG. 2 illustrates a diver unit according to one exemplary embodiment of the invention.

FIG. 2 illustrates an exemplary diver unit 10. The diver unit 10 comprises a waterproof housing 12 mounted on a wristband 14. The diver unit 10 includes an electronic display 16, such as a liquid crystal display, and one or more input devices 18. The exemplary embodiment shown in FIG. 1 includes a scroll wheel 20 and SEND/ENTER button 22. Those skilled in the art will recognize that other input devices, such as a joystick controller, keypad or touchpad, could be used for user input. Additionally, the display 16 may comprise a touchscreen display to receive user input.

The border 24 of the display 16 includes a series of labels 26 that describe various functions of the diver unit 10, e. g., "buddy," "beacon," etc. A function indicator 28 points to the currently selected function. In FIG. 1, the function indicator 28 indicates that the compass function is selected. Additionally, display 16 may display other status indicators, such as power indicator 30 and alarm indicator 31, to provide the user with status information. The function indicator 28 can be moved to select a function by rotating the scroll wheel 20 and pressing the ENTER/SEND button 22.

The effect of rotating the scroll wheel 20 may be context sensitive. For example, the scroll wheel 20 can be rotated to move the pointer 28 to a desired function. The function may then be selected by pressing the ENTER/SEND button 22. Once a function is selected, rotating the scroll wheel 20 can be used to scroll through menus or options associated with the selected function. For example, if the user selects "buddy," the scroll wheel 20 may be used to scroll through and select a buddy from a list of buddies.

In addition to status indicators, the display 16 is used to output useful information to the diver for viewing. In the exemplary embodiment, the display 16 can display a directional indicator 32. As will be described in more detail below, the directional indicator 32 is used to indicate direction to a target for navigating underwater. The display 16 may also include a numeric or alphanumeric display area 34 to display numeric and alphanumeric data to the diver. Examples of numeric data that can be displayed include the current depth, the distance to a specified target, the current time, and the current latitude and longitude. These examples are not intended to be a comprehensive list of all information that can be displayed, but merely illustrative of the types of information that may be displayed.

Figure 3:
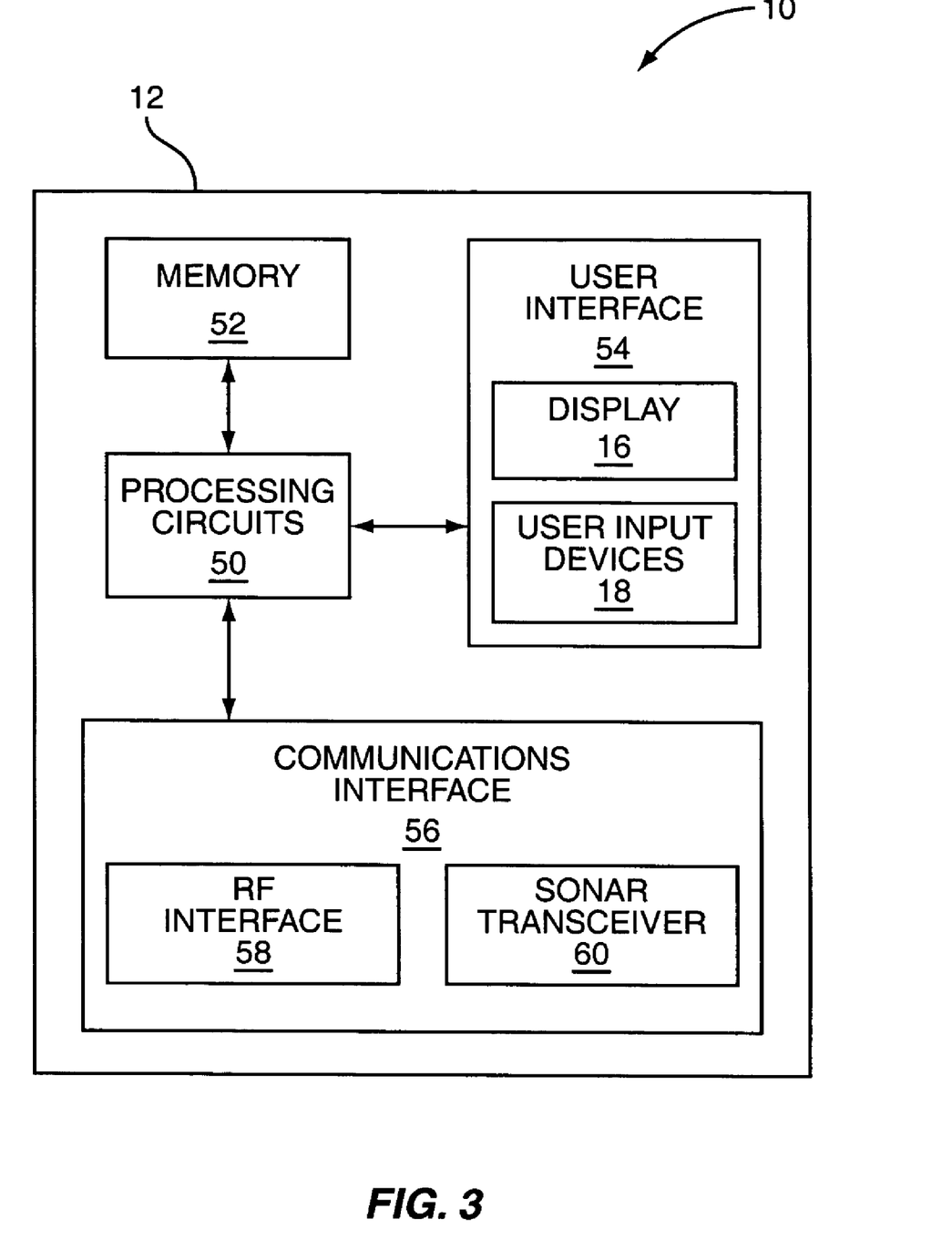
FIG. 3 is a functional block diagram illustrating the main components of the diver unit.

FIG. 3 is a functional block diagram illustrating the main components of the diver unit 10. The main components comprise processing circuits 50 for processing data and controlling operation of the diver unit 10, memory 52 for storing code and data used by the processing circuits 50, a user interface 54 that includes the display 16 and user input devices 18, and a communications interface 56. The processing circuits 50 may comprise one or more programmable processors, which may be general purpose microprocessors, microcontrollers, digital signal processors, or a combination thereof. Memory 52 represents the entire hierarchy of memory within the diver unit 10 and may comprise discrete memory devices, or may comprise internal memory in one or more microprocessors. The communications interface 56 comprises a radio interface 58 for use above water, and a sonar transceiver 60 for underwater communications. The radio interface may comprise, for example, a conventional BLUETOOTH, 802.11b, or 802.11g interface.

The boat unit 4 and beacon unit 6 may have the same functional components as shown in FIG. 3. The boat unit 4 may, however, have a different user interface 54. The user interface 54 can be omitted from the beacon unit 6.

In some embodiments, the diver unit 10 may include contacts 36 to detect when the diver submerges. When the diver submerges, a small amount of current will flow between contacts 36, which indicates that the diver has submerged. In response, the processing circuit 50 may disable the radio transceiver 58 and enable the sonar transceiver 60.

The diver unit 10 provides underwater communication and navigation functions to a diver. Underwater communications occur at sonar frequencies in the range of approximately 5 khz to 200 khz. The following is a description of a relatively simple and robust communication system for underwater communications that may be employed. Those skilled in the art will recognize, however, that any known communication system may be in place of the system described below.

In one exemplary embodiment, all underwater devices communicate on the same frequency using a time division multiple access scheme, however, code division multiple access schemes may also be employed. TDMA divides the communication spectrum into sequential time slots that are used to transmit and/or receive data. A device transmits and/or receives only in its assigned time slot(s). The set of non-repeating time slots constitutes a frame. In conventional TDMA systems, a frame has a fixed length and the frame timing is known to all units. In the present invention, the frame is a variable length frame that accommodates propagation delays between diver units 10 and there is no predetermined frame timing.

Figure 4:
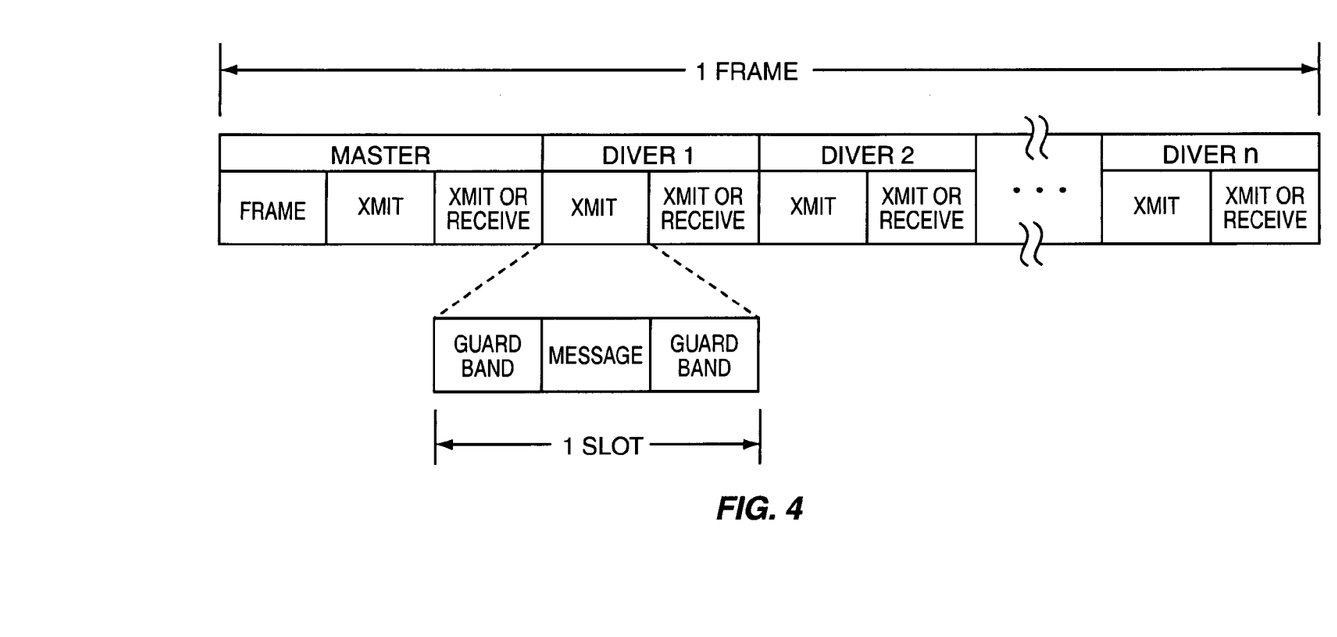
FIG. 4 illustrates an exemplary time division multiple access scheme for underwater communication.

FIG. 4 illustrates the frame structure of a TDMA frame accommodating one boat unit 4 serving as a master unit and n diver units 10. In the n diver scenario example shown in FIG. 4, each diver unit 10 is allocated two time slots. Thus, the frame includes 2n+m slots of 20 msec duration each, where n is the number of divers and m is the number of slots allocated to the boat unit 4. In the embodiment shown in FIG. 4, the first 3 time slots in the frame are allocated to the boat unit 4, which functions as the master unit. Each diver unit 10 is allocated two consecutive time slots. However, it is not required that the diver units 10 be allocated consecutive time slots. The boat unit 4 or other master unit may have up to eight (8) addresses and assign time slots to each of its addresses. Those skilled in the art will appreciate that the more than one boat unit 4 can be present. In that case, one of the boat units 4 is selected to function as the master unit. Also, beacon units 6, while not shown in FIG. 4, may be present and assigned time slots in the same manner as described below.

Each diver unit 10 controls the use of its allocated time slots. A diver unit 10 may transmit in the first time slot, while the second time slot can be used to transmit or receive. For example, a first diver unit 10 may transmit a message to a second diver unit 10 in its first time slot, and the second diver unit 10 may transmit a reply to the first diver unit 10 in the first diver unit's second time slot. Thus, the use of consecutive time slots to transmit and receive provides a convenient method of exchanging messages with another unit.

FIG. 4 also illustrates the slot format. Within each time slot, there is a guard band at the beginning and end of the time slot. The remaining time within each time slot is used to transmit message data. In one embodiment of the invention, each time slot is used to transmit or receive one message. However, those skilled in the art will appreciate that multiple messages could be transmitted in a single time slot if the duration of messages is short relative to the slot period. Conversely, if the message length is greater than the slot period, a message could be segmented and transmitted over multiple slots.

Figure 5:
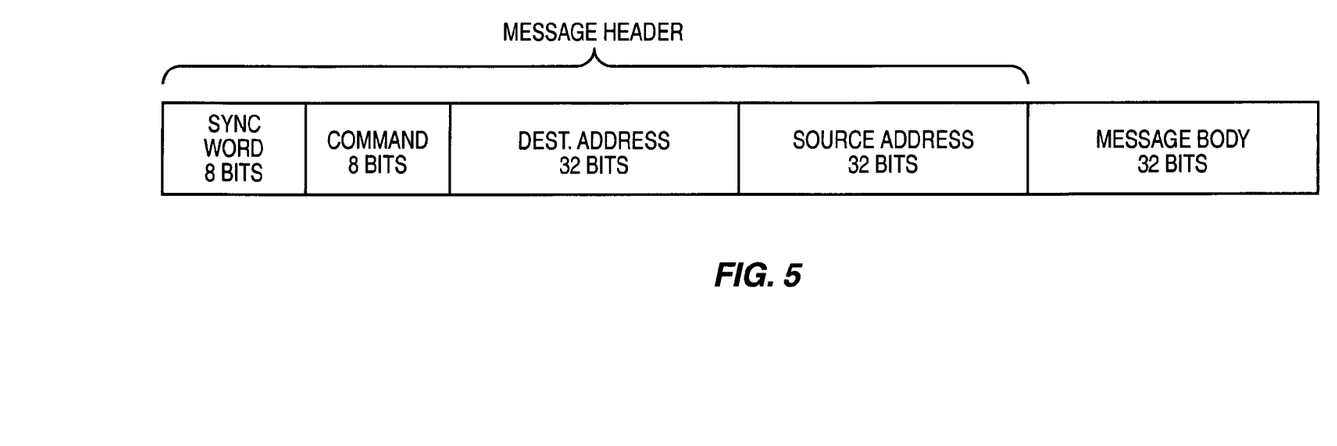
FIG. 5 illustrates an exemplary message format for underwater communications.

An exemplary message format is shown in FIG. 5. A message includes a message header and a message body. In the exemplary embodiment, the message header includes a sync word (8 bits), command (8 bits), destination address (32 bits), and source address (32 bits). The sync word is a known bit pattern used to indicate the start of a message. The command element indicates the message type to the receiving unit. If a message spans multiple time slots, the command element could be used to indicate whether the message data contained in the current slot is a continuation of the message transmitted in the previous slot. The destination address element indicates the intended recipient of the message. The source address element indicates the sender of the message. Each unit has a unique unit ID that is used as an address to address messages. For example, a message from unit A to unit B is addressed by placing the unit ID for diver unit A in the source address field, and placing the unit ID for unit B in the destination address field. The terms unit ID and address are used herein synonymously.

Table 1 in Appendix A contains a list of exemplary messages that may be used in the underwater communication system 2. These messages will be briefly described herein. Further details regarding the usage and message syntax is given in the Appendix.

The messages can be broadly classified into five categories. Those five categories include clock synchronization messages, distance and direction messages, communication messages, initialization messages, and miscellaneous messages. Clock synchronization messages are used to synchronize clocks between different units. The direction and distance messages are used to determine distance and direction between two units. Communication messages are used to send messages. Initialization messages are used to set up communications. The miscellaneous messages are used for miscellaneous functions.

The clock synchronization messages include a CLOCK SYNC message, a CLOCK SYNC REQUEST message, a CLOCK SYNC REPLY message, and CLOCK SYNC VERIFY message. The CLOCK SYNC REQUEST message is sent from a requesting unit to a responding unit to request synchronization of clocks between the two units. The CLOCK SYNC REQUEST message may optionally include a local water temperature and current depth, which if available, increases the accuracy of distance and time calculations. The CLOCK SYNC message is sent in response to the CLOCK SYNC REQUEST message. The CLOCK SYNC message includes the current clock of the sending unit, whose clock is being used as the master clock for the synchronization procedure. The receiving unit can use the current clock from the CLOCK SYNC message and the distance from the sending unit to update its own clock. If the receiving unit does not know the distance to the sending unit, the sending unit may send a PING RETURN message (described below) immediately preceding the CLOCK SYNC message so that the receiving unit can calculate the distance to the sending unit. A CLOCK SYNC REPLY message is sent in response to the CLOCK SYNC message. The CLOCK SYNC REPLY message includes the predicted value of the receiving unit's clock at the time that it receives the CLOCK SYNC REPLY message. The receiving unit compares the predicted time to the receiving unit's clock at the time of receipt of the message. If the times are equal within a predetermined tolerance, the clocks are synchronized. If not, the receiving unit may send another CLOCK SYNC message. The CLOCK SYNC VERIFY message is sent by one unit to another to verify that their clocks are in sync.

The direction and distance messages include the PING message, PING RETURN message, LOCATION ASSIST REQUEST message, LOCATION ASSIST REPLY message, CONFIRM message, and CONFIRM REPLY message. The PING and PING RETURN messages are used to determine distance and direction between two units. The PING RETURN message can also be sent in response to a CLOCK SYNC REQUEST message as described above. A first unit sends a PING message to a second unit. The PING message includes a clock value indicating the current clock of the sending unit when the PING message is sent. The second unit sends a PING RETURN message in reply. The PING RETURN message includes a clock value indicating the elapsed time between the receipt of the PING message and the transmission of the PING RETURN message to account for processing delays. The first unit can then use the time of arrival or time of travel methods described below to compute the distance between the two units.

The LOCATION ASSIST REQUEST message is used to request navigation assistance. The LOCATION ASSIST REQUEST message is typically sent from one diver unit to a beacon unit 6 or another diver unit 10, but may also be sent to either a boat unit 4 or other master unit. The LOCATION ASSIST REQUEST message specifies the unit ID for the target that the requesting unit desires to locate in the message body. The LOCATION ASSIST REPLY message is sent in response to the LOCATION ASSIST message. The LOCATION ASSIST REPLY message includes the distance and direction from the unit sending the LOCATION ASSIST REQUEST message to the target specified in the LOCATION ASSIST REQUEST message. The LOCATION ASSIST REPLY message may optionally include the depth of the target.

The CONFIRM message and CONFIRM REPLY message are used to verify a direction and distance measurements. The CONFIRM message contains the sending unit's depth, and its direction and distance to a specified target. The responding unit can then compute the direction and distance of the first unit to the specified target for comparison to the values received from the first unit. The CONFIRM REPLY message indicates whether the direction and distance measurements have been verified.

The communication messages include a POINT-TO-POINT message, a POINT-TO-MULTIPOINT message, a COMM RELAY REQUEST message, and a RETRANSMIT REQUEST message. The POINT-TO-POINT message is used to send a message from one unit to another. The intended recipient is specified by the destination address of the message. The POINT-TO-MULTIPOINT message is used to broadcast a message to a group of users. A POINT-TO-MULTIPOINT message is indicated by placing a group identifier in the destination address field of the message. A predetermined group identifier may be used to indicate a master group comprising all units. The emergency message is used to indicate an emergency situation. The COMM RELAY REQUEST message is sent from a first unit to a second unit to request the second unit to relay one or more messages to a specified target unit. This is useful when the intended recipient is obstructed. This message is also sent to stop message relaying.

The initialization messages include the INIT frame message, the UNIT SEQUENCE message, and the UNIT SEQUENCE ACK message. The INIT FRAME message is used to start the initialization procedure. The initialization procedure is a procedure to establish a transmit sequence. The INIT FRAME message is sent by the boat unit 4 or other master unit to all other units. The UNIT SEQUENCE message is sent by the boat unit 4 or other master unit to a specified diver unit 10 to indicate to the specified diver unit 10 its position in the transmit sequence. The position in the transmit sequence is identified by including the unit ID of the preceding diver unit 10 in the body of the UNIT SEQUENCE message. For example, the UNIT SEQUENCE message sent to diver B may include the unit ID for diver unit A in the message body. Thus, diver unit B knows that it will transmit after diver unit A. The UNIT SEQUENCE ACK message is sent by a diver unit 10 to the boat unit 4 or other master unit to acknowledge the UNIT SEQUENCE message.

The miscellaneous messages include the WAYPOINT message, FRAME message, ASSIST POLL message, and POLL RESPONSE message. The WAYPOINT message is sent by a diver unit 10 to a beacon unit 6 to activate or de-activate the beacon unit. The WAYPOINT message includes a 31-bit authentication code and a 1-bit command to either activate or deactivate the beacon unit 6. The FRAME message is a broadcast message sent by the boat unit 4 or other master unit to the diver units 10 to indicate the start of a frame. The FRAME message includes the current clock when the FRAME message is sent. If the diver units 10 have clocks synchronized with the master unit, the FRAME message can be used to determine the distance to the master unit and to synchronize clocks. The ASSIST POLL message is sent by a diver unit 10 to request navigation and communication assistance. The ASSIST POLL message includes a type parameter to indicate the type of assistance requested and may optionally include a unit type mask to poll only a particular type of unit (e. g. boat units, beacon units, diver units, etc.). The POLL RESPONSE message is sent in REPLY to an ASSIST POLL message to indicate acceptance or non-acceptance of the request.

Referring to the n diver example shown in FIG. 4, the boat unit 4 functioning as the master unit and the n diver units transmit in a predetermined sequence. Before communications begin, the master unit, e. g., boat unit 4, establishes the transmit order and notifies all other units (e, g, diver units 10, and other boat units 4 or beacon units 6 if present) of their place in the transmit order. During an initialization procedure, the boat unit 4 or other master unit transmits a UNIT SEQUENCE message to each diver unit 10 or other unit present that identifies the preceding diver unit 10 or other unit in the transmit sequence. In the case of Diver Unit 1, the preceding diver unit 10 is the boat unit 4. The initialization procedure ends when each diver unit 10 acknowledges the UNIT SEQUENCE message. During normal operations, each diver unit 10 listens for a transmission originating from the preceding diver unit 10, which can be determined by the source address in the header of the messages transmitted in using "slot 1" for a particular unit and either the source address or destination address of messages transmitted using "slot 2." After detecting the preceding diver unit 10 or other unit has finished transmitting, the next diver unit 10 or other unit waits a predetermined time before transmitting. The predetermined time period is chosen to prevent collisions. Consequently, the length of the frame will depend on the number of diver units 10 and the propagation delays between diver units 10.

A problem may arise when an obstruction lies between two diver units 10 that transmit consecutively. In this situation, the second diver unit 10 may not be able to "hear" communications from the first diver unit 10. One consequence is that communications will stall because the second diver unit 10 will not transmit. In this situation, the boat unit 4 may restart a transmit sequence if no signals are detected within a predetermined period of time by transmitting a new FRAME message. If the communications continue to stall, the boat unit 4 can invoke the initialization procedure to change the transmit order. If changing the transmit order does not solve the problem, the diver unit 10 that is stalling the communications can be dropped from the transmit sequence.

In the exemplary embodiment, the carrier frequency is 200 kilohertz and the bit period is 0.06 msecs (60 μsec), which equates to a data transmission rate of approximately 16.67 kbps. A message comprises a total of 112 bits. Thus, it takes 6.72 msec to transmit the message.

Figure 6:
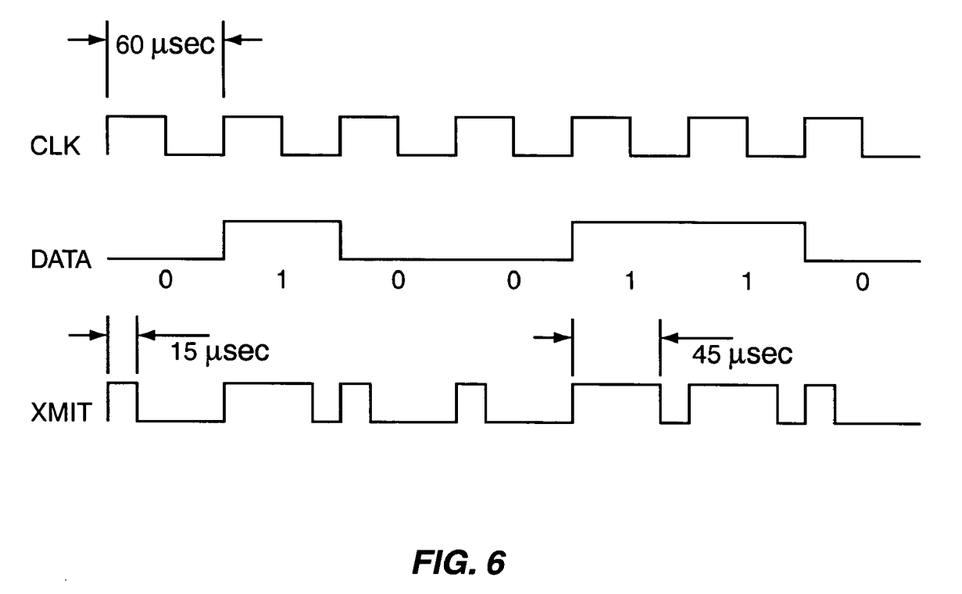
FIG. 6 illustrates an exemplary modulation scheme for underwater communications

FIG. 6 illustrates how data is modulated onto a carrier frequency. FIG. 6 illustrates a clock signal, data signal, and modulation signal. The clock signal has a period of 60 μsec, which is equal to the bit period. The data signal represents binary data that is being transmitted. The modulation signal comprises a pulse train at the same frequency as the clock signal. The pulse width of a given pulse in the modulation signal is determined by the state of the data signal. When the data signal is low, a relatively short pulse is generated to indicate a "0" bit. Conversely, when the data signal is high, a relatively long pulse is generated to indicate a "1" bit. In the exemplary embodiment, the short pulses indicative of a 0 bit are 15 microseconds in duration and the long pulses indicative of a 1 bit are 45 microseconds. On/Off keying is used to modulate the carrier. The carrier is turned on when the modulation signal is high, and is turned off when the modulation signal is low. The receiver samples the signal 37 microseconds after detecting the rising edge of a pulse to detect the signal. In an alternative embodiment, a variable sampling time after detection of the rising edge may be used to compensate for variations in the clock rate at the transmitter. More particularly, the receiving unit may measure the time between rising edges of the pulses in the received signal to determine the period of the transmitter clock and adjust the sampling time accordingly. The measurement of the clock period may be performed when the sync word is being transmitted. In one exemplary embodiment, the sampling time $T_s$ is determined by multiplying the transmit clock period by 0.625.

As noted earlier, the diver unit 10 provides navigation assistance. In particular, the diver unit 10 can display the distance and direction to a specified target via directional indicator 32. The specified target may comprise a dive boat, a beacon (which may be a surface beacon or underwater beacon), or another diver (referred to as a buddy). The desired target is selected by moving indicator 28 using the scroll wheel 20 and button 22 to select a target. For example, the user may move the function indicator 28 to "BUDDY" by rotating the scroll and press the ENTER button 22. If a Buddy is stored in memory, the name of the Buddy will then appear on the display. If multiple Buddies are stored in memory, the user can scroll through a list of buddies by rotating the scroll wheel 20. When the desired buddy's name appears on the display, the buddy is selected by pressing the ENTER button 22. The same method can be used to select a boat or beacon.

Once the specified target is selected, the diver unit 10 computes the distance and direction to the target. The distance and direction may be displayed to the diver on display 16. While various methods of determining distance and direction are described below, those skilled in the art will appreciate that the present invention is not limited to these methods and that any known methods may be used.

One method for determining distance to a target is referred to herein as the time of arrival method. This method requires clock synchronization between the diver unit 10 and the target. The target may be another diver unit 10, the boat unit 4, or a beacon unit 6. In this method, the diver unit 10 requests the target to transmit a PING message at a time known to the diver unit 10. The request message may specify the transmit time, or the transmit time may be specified by the protocol. For example, the protocol may specify that the target unit transmit a PING message for determining distance only when the 20 least significant bits of the clock are all 0. Because the clocks of the target and diver unit 10 are synchronized, the diver unit 10 can use the time of arrival of the PING message to compute the distance to the target. Alternatively, the diver unit 10 could transmit a PING message to the target when the 20 LSBs of the clock are all "0", and the target may return either the time of arrival of the PING message or the computed distance in a reply message.

Another technique that may be used to compute distance to a target is referred to herein as the time of travel method. This method is useful when the clocks of the diver unit 10 and target are not synchronized. In this method, the diver unit 10 sends a PING message to the target. Upon receipt of the PING message at the target, the target generates and sends a PING RETURN message to the diver unit 10. The PING RETURN message includes a delay value indicating the delay between the time the PING message was received and the time that the PING RETURN message was sent. The diver unit 10 may use the roundtrip time and the turn-around delay to compute the distance to the target.

A third method for determining distance to a target is referred to herein as the dual tone method. In this method, the diver unit 10 requests the target to send a dual tone signal to aid in determining distance to the target. In response, the target transmits a dual tone signal comprising two distinct tones with equal power or with a known power ratio. The power in each tone will attenuate as a known function of distance traveled. With knowledge of the attenuation rate for each tone component, the diver unit 10 can compute distance to the target based on the difference in the received power of the tone components.

Figure 7:
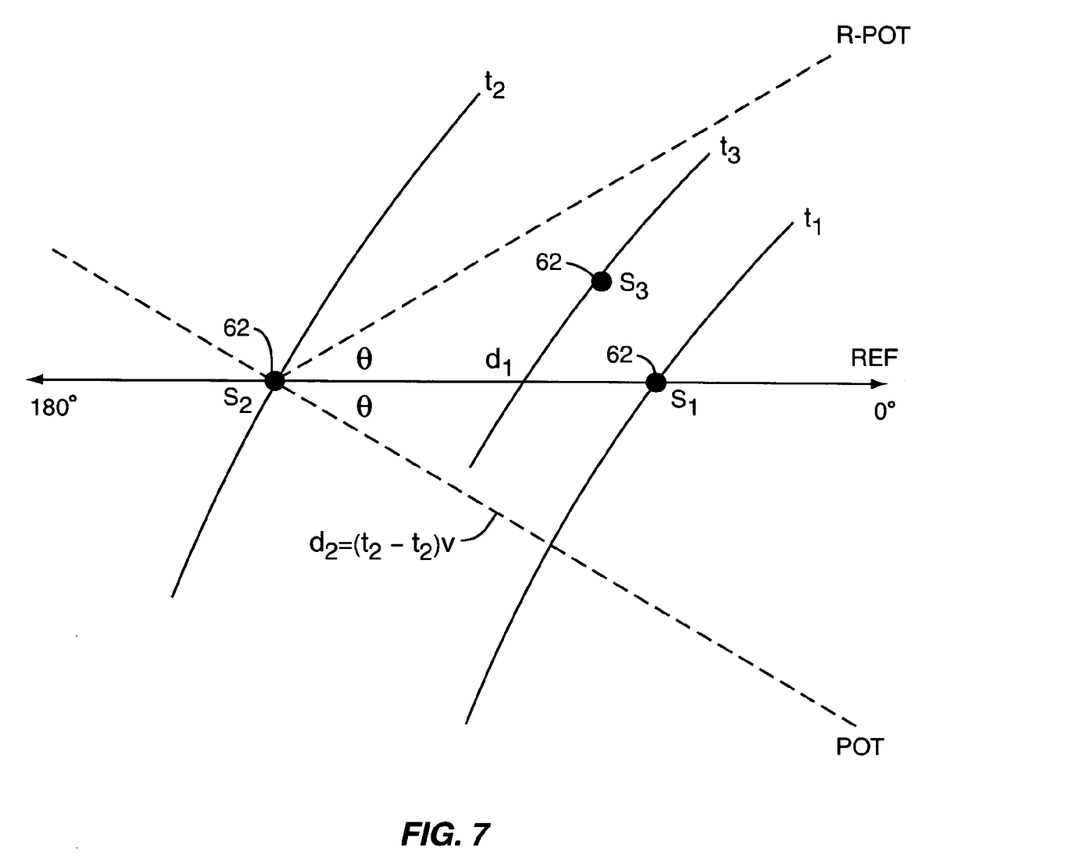
FIG. 7 illustrates a method of determining a direction to target.

To determine the direction to a target, the sonar transceiver includes an array of sonar transducers 62. Assuming that the rate of travel of a signal in water is known, the diver unit 10 can compute the direction-to-target based on the time difference of arrival of a signal at two or more transducers 62 as shown in FIG. 7. FIG. 7 shows first and second sonar transducers 62 denoted S1 and S2, respectively. The line extending through sensors S1 and S2, denoted as REF, serves as an angular reference for directions. The signal from the target reaches sensor S1 at time T1, and reaches sensor S2 at time T2. The distance d1 between sensors S1 and S2 along the reference line REF is known. Distance d2 along the path of travel of the signal may be computed based on the arrival times of the signal at sensors S1 and S2 by multiplying the difference in arrival time by the velocity v of the signal. The inverse cosine of the ratio d2/d1 yields the angle between the reference line REF and the path of travel (POT).

To unambiguously indicate the direction in two dimensions, a third sensor S3 is required to discriminate between the actual path of travel (POT) and a reflection of the path of travel (R-POT) about the reference line (REF). Those skilled in the art will appreciate that a signal traveling along a line corresponding to the reflected path of travel (R-POT) will produce the same time difference of arrival at sensors S1 and S2. A third sensor S3 enables the navigation aid 10 to discriminate between the actual path of travel (POT) and its reflection (R-POT). The sensor S3 is offset from the reference line REF extending through sensors S1 and S2. To determine direction in three dimensions, at least four sonar transducers 62 are needed, one of which must be outside the plane containing the other three.

Figure 8:
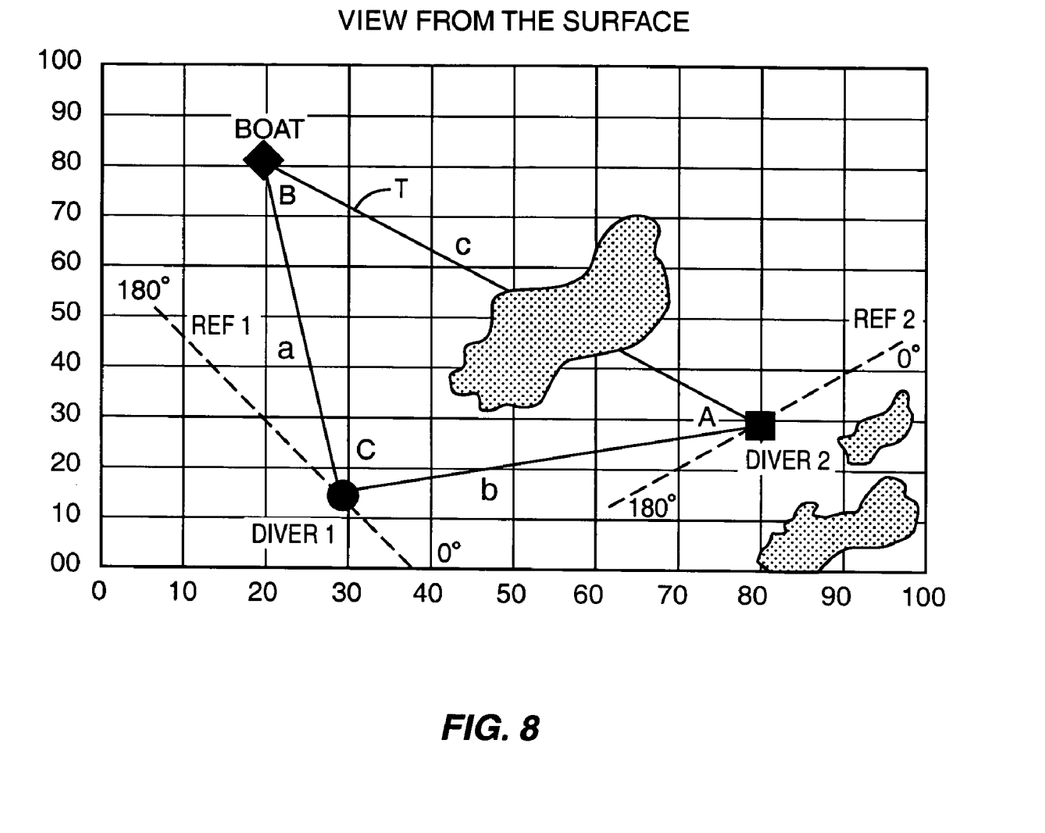
FIG. 8 is an aerial view illustrating a technique for determining distance and direction to a target by an obstructed diver.

FIG. 8 illustrates a method of determining the direction and distance to a target that is obstructed from view. FIG. 8 is an aerial view showing the location of two divers and a dive boat. Diver Unit 1 has a clear line of sight to the dive boat, while Diver Unit 2's view of the dive boat is obstructed by a coral reef or land mass. Diver Unit 2 would like to obtain the direction and distance to the dive boat but is unable to communicate directly with the dive boat. In this situation, Diver Unit 2 can request navigation assistance from Diver Unit 1 by sending a LOCATION ASSIST REQUEST message. Diver Unit 1 can determine its distance and direction relative to REF1 to the dive boat. Additionally, Diver Unit 1 can compute its distance and direction relative to REF1 to Diver Unit 2. Thus, distances a, b and angle C of the reference triangle T are known to Diver Unit 1. Using the law of cosines Diver Unit 1 can compute the distance c from Diver Unit 2 to the dive boat. Once distance c is known, Diver Unit 1 can use the law of sines to compute the included angle A between a first line extending through the current locations of Diver Unit 1 and Diver Unit 2 and a second line extending through the current locations of Diver Unit 2 and the dive boat. Diver Unit 1 can then transmit the distance c to the dive boat from Diver Unit 2's current location and the included angle A to Diver Unit 2. The problem is that the included angle A does not indicate a direction to Diver Unit 2 because Diver Unit 2 does not know the orientation of lines b and c in the reference triangle T relative to its own reference line REF2.

To determine the direction to the dive boat, Diver Unit 2 needs to relate line c to its own angular reference REF2. To relate the direction to the dive boat to REF2, Diver Unit 2 can compute its direction to Diver Unit 1 relative to REF2. Since the included angle A is referenced to a line extending through the current location of Diver Unit 1 and Diver Unit 2, Diver Unit 2 can compute the direction to the dive boat by adding the included angle A and its direction to Diver Unit 1 to determine the direction to the dive boat relative to REF2.

The following is a worked-out example based on FIG. 8. For simplicity, the calculations reflect only two dimensions. Those skilled in the art can easily extend the method to three dimensions.

In the Example, Diver Unit 2 has request navigation assistance from Diver 1 by sending a LOCATION ASSIST REQUEST to Diver 1. Diver Unit 1 determines its distance and direction to the dive boat. The direction to the dive boat is determined with reference to Diver Unit 1's own angular reference REF1. In this example, the direction is 216° relative to REF1 and the distance is approximately 65.75 meters. Next, Diver Unit 1 computes the distance (approximately 52.20 meters) and direction (approximately 298° with respect to REF1) to Diver Unit 2. Diver Unit 1 computes the included angle C of the reference triangle T to be approximately 82°. Diver Unit 1 now knows distances a and b and the included angle C of referenced triangle T. Diver Unit 1 can then compute the distance c from Diver Unit 2 to the dive boat according to the law of cosines.

$$c^2 = a^2 + b^2 - 2ab \cos C \qquad \text{Eq. 1}$$

The distance c from Diver Unit 2 to the dive boat is computed to be approximately 78 meters. The included angle A can then be computed according to the law of sines:

$$\frac{a}{\sin A} = \frac{b}{\sin B} = \frac{c}{\sin C} \qquad \text{Eq. 2}$$

The included angle A is computed to be approximately 56.6°. Diver Unit 1 sends distance c (78.1 meters) and included angle A (56.6°) to Diver Unit 2. Adding the included angle A to his direction to Diver Unit 1, Diver Unit 2 computes the direction to the dive boat relative to reference REF2 to be approximately 255°. Diver Unit 2 could, in some embodiments, send to Diver Unit 1 the angle of the line between the two units relative to REF2. In this case, Diver Unit 1 could compute the direction of Diver Unit 2 to the dive boat relative to Diver Unit 2's own internal reference.

In the example given above, Diver Unit 1 computes the distance c from Diver Unit 2 to the dive boat and the included angle A of the reference triangle T and sends the results to Diver Unit 2. Alternatively, Diver Unit 1 could send the distance a from Diver Unit 1 to the dive boat and included angle C of the reference triangle T to Diver Unit 2, and Diver Unit 2 could perform all subsequent computations as described above. In this case, Diver Unit 2 could determine its distance to Diver Unit 1 using any one of the distance measurement techniques described above. With knowledge of distances a, b and included angle C. Diver Unit 2 could then compute the distance c to the dive boat and the included angle A. The remaining computations to compute the direction to the dive boat relative to reference REF2 are the same as described above.

Figure 9:
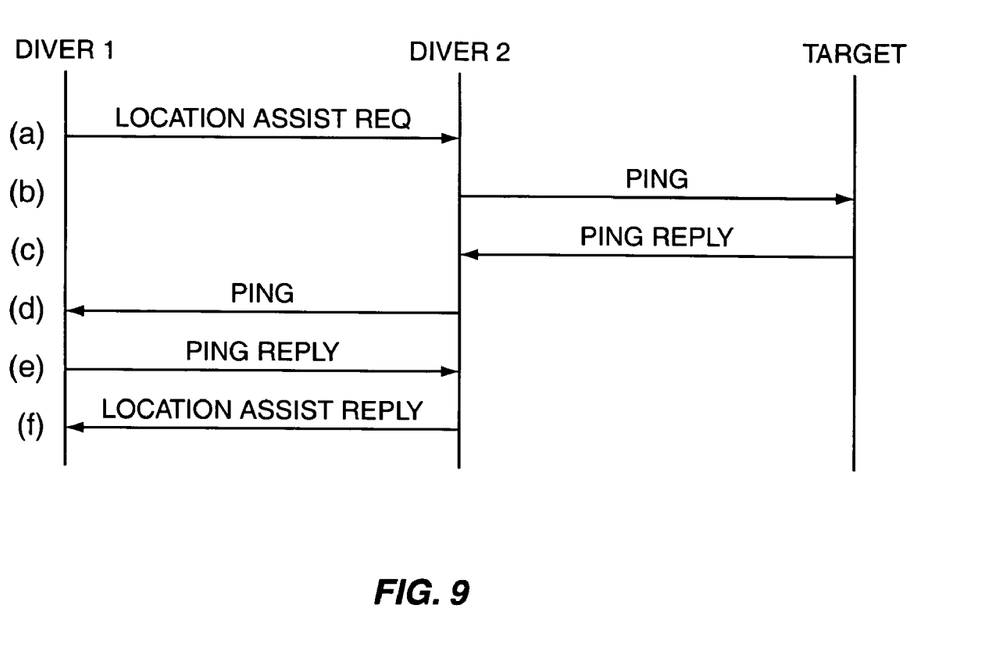
FIG. 9 is a call flow diagram illustrating an exemplary procedure for determining distance and direction to an obstructed target.

FIG. 9 illustrates an exemplary procedure for obtaining distance and direction to an obstructed target. Diver 1 sends a LOCATION ASSIST REQUEST to Diver 2 to request assistance in determining the distance and direction to the target (step a). Upon receipt of the location assist request, Diver 2 sends a PING message to the target in response to which the target sends a PING REPLY message to Diver 2 (steps b and c). Next, Diver 2 sends a PING message to Diver 1 in response to which Diver 1 sends a PING REPLY message to Diver 2 (steps d and e). Steps 9b), (c), (d) and (e) can be omitted if the distances are already known. At this point, Diver 2 has all the information it needs to compute the distance and direction from Diver 1 to the target. Diver 2 computes the distance and direction from Diver 1 to the target and sends the information to Diver 1 in a location assist reply.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

APPENDIX A

| MESSAGE | USAGE | MESSAGE BODY PARAMETERS | DESCRIPTION |
|---|---|---|---|
| CLK Sync Request | Sent by a slave unit to initiate clock synchronization. May be sent to Master Boat unit, Beacon Unit or to another Diver Unit. | Temperature | Optional parameter. If available, this parameter increases the accuracy of the distance calculation. |
| | | Depth | Optional parameter. If available, this parameter increases the accuracy of the distance calculation. |
| CLK Sync | Sent by "master" unit to a "slave" unit to synchronize clocks | Clock | Indicates clock value when CLK Sync is sent (If a Boat Unit is present, it is the "master" If no Boat Unit is present but a Beacon Unit is present, the Beacon Unit is the master. If only Diver Units are present the Unit with the lowest (highest) address is the master.) |
| CLK Sync Reply | Sent by a "slave" unit to "master" unit in response to CLK Sync | Clock | Indicates the predicted value of the "master's" CLK (adjusted for propagation delay and processing times) when this command is received by the "master" |

APPENDIX A-continued

| MESSAGE | USAGE | MESSAGE BODY PARAMETERS | DESCRIPTION |
|---|---|---|---|
| | | | Unit. |
| CLK Sync Verify | Sent by one Unit to another Unit to verify clock synchronization | Clock | Indicates the predicted clock value when the message is received by the receiving unit. |
| Init Frame | Sent to start initialization procedure | Frame type | Indicates Random Access frame type with all transmissions initiated by the "master" unit. |
| Frame | Sent to indicate start of a new frame | Frame type | Indicates "Sequential Access" frame type with transmission initiated upon "hearing" the assigned previous unit complete its communications |
| Unit Sequence | Sent by master unit to slave unit(s) to establish transmit sequence. | Unit ID | Sequence identifying Unit that transmits in the preceding slot(s). The Unit receiving the message will transmit after it "hears" the preceding diver unit transmit. NOTE: The preceding Unit has two slots assigned to it. A Unit transmits after two slots (i.e. the "transmit" slot and the "transmit or receive" slots of the previous unit.) |
| Unit Sequence ACK | Sent by slave unit to master unit to acknowledge unit sequence message | Unit ID | Sequence identifying unit that transmits in the preceding slot(s). The unit receiving the message will transmit after it "hears" the preceding unit transmit. |
| Ping | Sent by a unit to another unit to determine distance and direction | Clock | Indicates when Ping Message is sent |
| Ping Return | Sent in reply to a Ping Message or a CLK Sync Request | Clock | Indicates elapsed time between time PING message is received and time that PING RETURN message is transmitted. |
| PTP | Point to point message sent between any two units | Message sequence | Indicates sequence number of the message |
| | | Message ID | Indicates the message ID |
| | | Message effects | Indicates how the message is announced (e.g. sound, |

APPENDIX A-continued

| MESSAGE | USAGE | MESSAGE BODY PARAMETERS | DESCRIPTION |
|---|---|---|---|
| PTM | Broadcast message sent by master or dive unit to all units | Message type | Indicates the message type |
| | | Message ID | Indicates the message ID |
| | | Announce flag | Indicates how the message is announced (e.g. sound, lights, vibrations, etc.) |
| Assist Poll | Used to determine other units in distance willing to provide navigation or communication assistance | Type | Indicates type of assistance requested (e.g. location assistance, communication assistance, etc) |
| | | Unit Type Mask | Indicates unit type (e.g. boat beacon, etc.) |
| Poll Response | Response to Assist Poll | ACK/NACK | Indicates acceptance or non-acceptance of request |
| Location Assist Req | Sent by a unit to another unit to request navigation assistance | Unit ID | Unit identification indicating desired target to locate |
| Location Assist Reply | Sent in response to Location Assist Request to provide assistance data to requesting unit | depth | Indicates depth of target |
| | | distance | Indicates distance from requesting unit to target |
| | | direction | Indicates direction from requesting unit to target |
| Confirm Request | Sent by one unit to another to verify bearing and distance calculation | depth | Indicates depth of requesting unit |
| | | distance | Indicates distance from requesting unit to target |
| | | direction | Indicates direction from requesting unit to target |
| Confirm Reply | Sent by a unit in response to Confirm Request | depth | Indicates depth of responding unit |
| | | distance | Indicates distance from responding unit to requesting unit |
| | | direction | Indicates direction from responding unit to requesting unit |
| Waypoint Marker | Sent to activate/deactivate waypoint | Security key | Used for authentication |
| | | Action | Used to activate/deactivate waypoint (1 to activate; 0 to deactivate) |
| Com Relay Request | Sent to request relay assistance from receiving unit | Request type | Indicates type of request (0 = stop relaying; 7 = relay current message; F = relay all messages) |
| | | Target | Indicates target for relayed messages |
| Retransmit Req | Sent to request re-transmission of messages | Sequence Number | Indicates sequence number of message to be re-transmitted |

The invention claimed is:

1. A method of underwater navigation, said method comprising:

determining, at a first underwater device, a direction to a target relative to a first angular reference known to the first underwater device;

establishing a reference line between the first and a second underwater device, said reference line forming the base of a reference triangle whose vertices correspond respectively to the first underwater device, the second underwater device and the target;

computing, at the first underwater device, a first included angle of said reference triangle between the reference line and a line extending from the first underwater device to the target based on the direction to the target from the first underwater device;

determining, at the first underwater device, a first distance between the first underwater device and the target;

determining at the first underwater device, a second distance between the first and second underwater device;

computing, at the first underwater device, a third distance from the second underwater device to the target based on the first included angle and the first and second distances; and transmitting the third distance to the second underwater device to assist the second underwater device in locating the target.

2. The method of claim 1 further comprising:

computing at said first underwater device the direction from the second underwater device to the target; and sending from the first underwater device to the second underwater device the direction of the second underwater device to the target.

3. The method of claim 2 wherein the direction from the second underwater device to the target is computed relative to the reference line between the first and second underwater devices.

4. The method of claim 2 wherein the direction from the second underwater device to the target is computed relative to an angular reference provided to said first underwater device by said second underwater device.

5. The method of claim 1 further comprising:

computing, at the first underwater device, a second included angle in the reference triangle between the reference line and a line extending from the second underwater device to the target, and transmitting the second included angie to the second underwater device.

6. The method of claim 5 further comprising computing, at the second underwater device, the direction to target relative to a second angular reference known to the second underwater device based on the second included angle and the direction from the second underwater device to the first underwater device.

7. The method of claim 6 further comprising sending from said second underwater device to said first underwater device, the angle between the reference line and an angular reference used by the second underwater device, and wherein the first underwater device computes the direction relative to said angular reference used by said second underwater device.

8. The method of claim 1 further including transmitting the first included angle to the second underwater device.

9. The method of claim 8 further including computing, at the second underwater device, a second included angle between the reference line and a line extending from the second underwater device to the target.

10. The method of claim 9 further comprising computing, at the second underwater device, the direction to target relative to an angular reference known to the second underwater device based on the second included angle and the direction from the second underwater device to the first underwater device.

11. The method of claim 1 wherein computing the first included angle comprises computing a direction from the first underwater device to the second underwater device, and using the direction to target and the direction to the second underwater device to compute the first included angle.

12. The method of claim 1 wherein determining distance comprises:
   receiving a signal; and
   computing the distance based on the time of arrival of the signal.

13. The method of claim 1 wherein determining distance comprises:
   transmitting a signal;
   receiving a reply signal; and
   computing the distance based on the time of arrival of the reply signal.

14. The method of claim 1 wherein determining the distance to the target comprises:
   receiving a dual tone signal from the target; and
   computing the distance based on a difference in signal strength between first and second tones in the dual tone signal.

15. A method of underwater navigation, said method comprising:
   determining, at a first underwater device, a direction to a target relative to a first angular reference known to the first underwater device;
   establishing a reference line between the first and a second underwater device, said reference line forming the base of a reference triangle whose vertices correspond respectively to the first underwater device, the second underwater device and the target;
   computing, at the first underwater device, a first included angle of said reference triangle between the reference line and a line extending from the first underwater device to the target based on the direction to the target from the first underwater device;
   determining, at the first underwater device, a first distance between the first underwater device and the target; and
   transmitting the first included angle and the first distance to the second underwater device to assist the second underwater device in locating the target.

16. The method of claim 15 further comprising:
   determining, at the second underwater device, a second distance between the first and second underwater device;
   computing, at the second underwater device, a third distance to the target based on the first included angle and the first and second distances.

17. The method of claim 16 further comprising computing, at the second underwater device, the direction from the second underwater device to the target based on the first included angle, the first distance, and the third distance.

18. The method of claim 15 wherein determining distance comprises:
   receiving a signal; and computing the distance based on the time of arrival of the signal.

19. The method of claim 15 wherein determining distance comprises:
   transmitting a signal;
   receiving a reply signal; and
   computing the distance based on the time of arrival of the reply signal.

20. The method of claim 15 wherein determining the distance to the target comprises:
   receiving a dual tone signal; and
   computing the distance based on a difference in signal strength between first and second tones in the dual tone signal.

* * * * *